United States Patent [19]

Balchunas

[11] 3,754,107

[45] Aug. 21, 1973

[54] WALL PLUG-IN TIME SWITCH
[75] Inventor: Charles A. Balchunas, Hopkinton, Mass.
[73] Assignee: General Electric Company, Bridgeport, Conn.
[22] Filed: June 8, 1972
[21] Appl. No.: 260,759

[52] U.S. Cl. .......................... 200/38 A, 200/38 FB
[51] Int. Cl. ........................ H01h 7/08, H01h 43/10
[58] Field of Search ............................ 200/38, 6 BB

[56] References Cited
UNITED STATES PATENTS
2,673,901    3/1954    Kountz .............................. 200/38 A
3,588,391    6/1971    Banathy ............................. 200/6 BB Primary Examiner—J. R. Scott
Attorney—Lawrence R. Kempton et al.

[57] ABSTRACT

A wall plug-in time switch wherein a pair of shouldered wall prongs are uniquely mounted in a housing of the time switch for connecting the time switch to a conventional wall mounted outlet box. The construction includes shoulders on the wall prongs which are sandwiched between bosses which are formed on a rear casing and a front cover of the time switch housing. Electrical outlet receptacle spring contacts are placed directly over the wall prongs, and terminals for an electric motor are also located in the vicinity of the wall prongs so that the wall prongs, receptacle spring contacts, and electric motor are reliably connected to each other and positioned within the housing with the use of relatively few parts.

8 Claims, 6 Drawing Figures

Patented Aug. 21, 1973 3,754,107

WALL PLUG-IN TIME SWITCH

BACKGROUND OF THE INVENTION

This invention relates to a wall plug-in timer, and more particularly to an improved construction for mounting and housing the inlet prongs, electrical outlet receptacle spring contacts, electric motor and other components of a wall plug-in timer.

With a conventional wall plug-in timer a plastic housing is usually provided for enclosing an electric motor for driving a 24-hour time wheel which is rotatably mounted at the front of the housing. A pair of inlet prongs extend rearwardly from the housing for connecting the time switch to a conventional electrical outlet box, and a pair of receptacle slots are usually formed in the front portion of the housing for permitting a device to be controlled, such as an electric coffeemaker or lamp, to be plugged into the receptacle slots. Naturally, contact springs are positioned immediately below the receptacle slots for making appropriate contact with the electrical plug of the coffeemaker or lamp to be controlled. Such timers also conventionally include electrical wiring between the inlet prongs, the electric motor, switch contacts, and the electric outlet receptacle contacts. My invention is concerned with such a wall plug-in timer, and more particularly to a unique arrangement for locating and mounting the inlet prongs, receptacle spring contacts, and the electric motor with the use of relatively few parts which may be readily and reliably connected to each other.

SUMMARY OF THE INVENTION

Accordingly, it is a primary object of this invention to provide an improved wall plug-in timer which may be inexpensively manufactured with the use of relatively few parts.

In accordance with one of the aspects of this invention a rear casing of the timer is formed with an inwardly projecting boss which is formed of plastic or other suitable electrical insulating material. A pair of slots are formed in the boss and a pair of shouldered inlet prongs are inserted within the slots. The shoulders on the inlet prongs extend outwardly away from each other and are positioned against an inner surface of the boss. Terminal portions of the inlet prongs extend inwardly away from the surface of the boss. A complementary boss is formed on a front cover of the time switch housing for sandwiching the shoulders of the inlet prongs between the boss on the rear casing and the boss on the front cover. The terminal portions of the inlet prongs are positioned on opposite sides of the boss which is formed on the front cover and a pair of receptacle spring contacts and connections to an electric motor may be readily made to these integrally formed terminals of the inlet prongs without the use of separate wires. With this construction, the inlet prongs are securely held in a time switch housing, and a pair of receptacle spring contacts and an electric motor may be readily connected to the inlet prongs. Thus, a very simple yet effective and reliable construction for a wall plug-in timer has been achieved.

BRIEF DESCRIPTION OF THE DRAWING

Other objects and attendant advantages of the invention will be apparent from the following description taken in connection with the accompanying drawing in which.

DESCRIPTION OF THE PREFERRED EMBODIMENT

Figure 1:
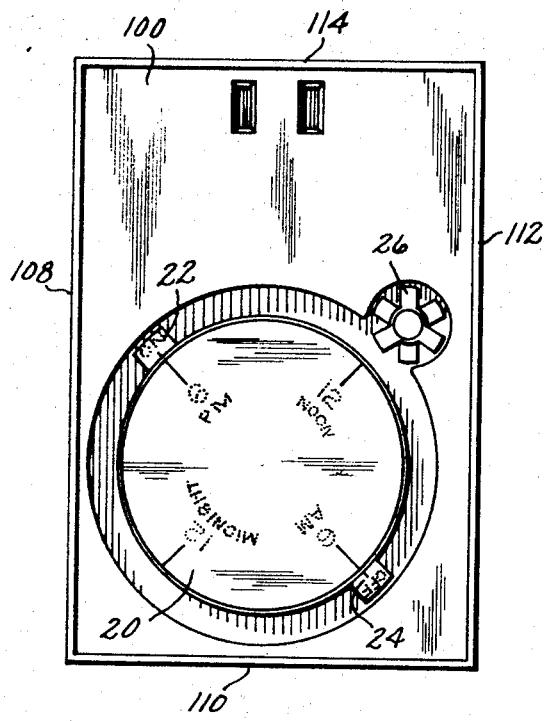
FIG. 1 is a front elevational view of a time switch constructed in accordance with my invention.
Figure 2:
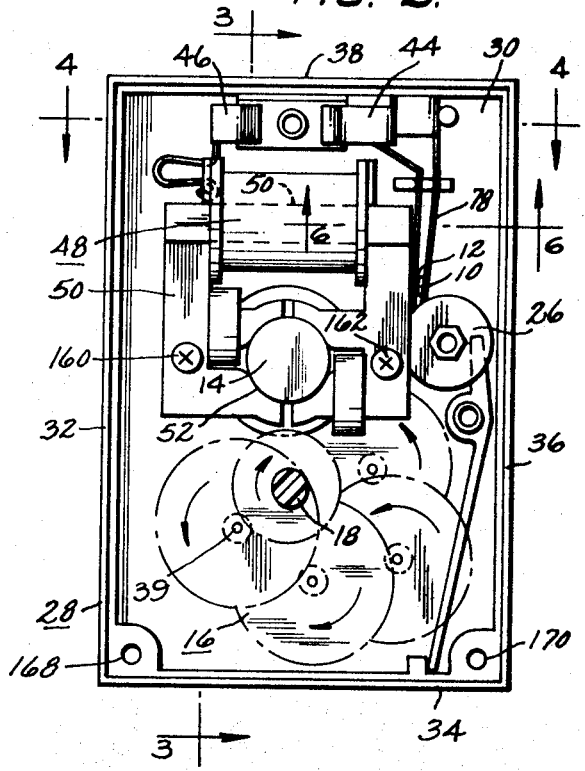
FIG. 2 is a front elevational view of the time switch illustrated in FIG. 1 with a front cover of the time switch removed for purposes of illustration.

Referring now to the drawing and first particularly to FIGS. 1 and 2, there is shown a wall mounted time switch constructed in accordance with my invention. The time switch includes a pair of switch contacts 10 and 12 for controlling the operation of an electric coffeemaker, lamp, or similar appliance, and a synchronous electric motor 14 is provided for operating the switch contacts 10 and 12 at the preset times. As illustrated more particularly in FIGS. 2 and 3, the motor 14 drives a gear reduction unit 16 which in turn rotates a shaft 18.

Figure 3:
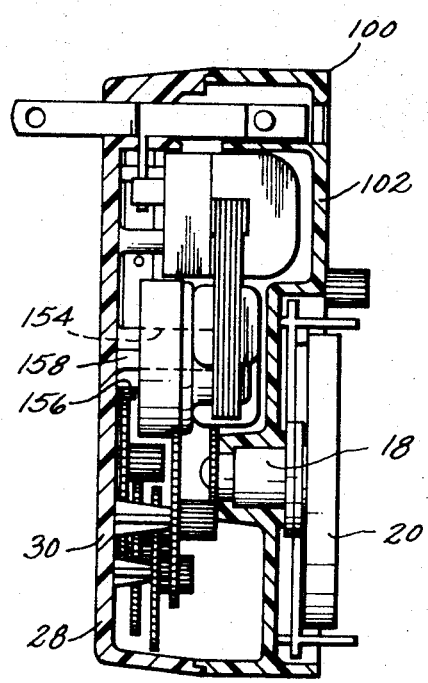
FIG. 3 is a cross-sectional view of the time switch illustrated in FIG. 1 taken along the line 3—3 of FIG. 2.

With particular reference to FIGS. 1 and 3, the shaft 18 carries a 24-hour dial 20 which carries ON and OFF trip levers 22 and 24, respectively. The positions of the ON and OFF trip levers on the 24-hour dial 20 may be manually set by a user of the time switch to turn an appliance on and off at the desired times, and thus, the dial 20 drives the trip levers 22 and 24, and at the appropriate times the trip levers actuate a switch operating mechanism 26 to open and close the switch contacts 10 and 12 at the preset times.

In carrying out the object of my invention the entire rear casing of the time switch is made from a single molded member 28 which includes a rear panel 30 and forwardly extending side wall portions 32 and 36, a top wall 38 and a bottom wall 34. Forwardly extending studs 39 are also integrally formed with the rear casing for mounting the electric motor 14, the reduction gearing 16, and the other components of the time switch.

In accordance with my invention a pair of shouldered inlet prongs 40 and 42 are uniquely formed and located with respect to a pair of outlet receptacle springs 44 and 46 and the electric motor 14 for enabling these parts to be effectively and reliably connected to each other with the use of relatively few parts. To achieve this the outlet receptacle springs 44 and 46 which are provided for making contact with a plug of the appliance to be controlled are positioned just forwardly of the inlet prongs 40 and 42 which are arranged to be plugged into any conventional wall mounted outlet box. The conventional synchronous electric motor 14 includes an electrical coil 48 which surrounds the usual field laminations 50 for driving a rotor which is positioned within a casing portion 52. Conventionally, input electrical terminals 54 and 56 are positioned at opposite sides of the motor coil 48, and thus, as shown, the motor coil terminals 54 and 56 are located closely adjacent to a respective inlet prong 40 or 42 and a respective outlet receptacle spring 44 or 46.

Figure 5:
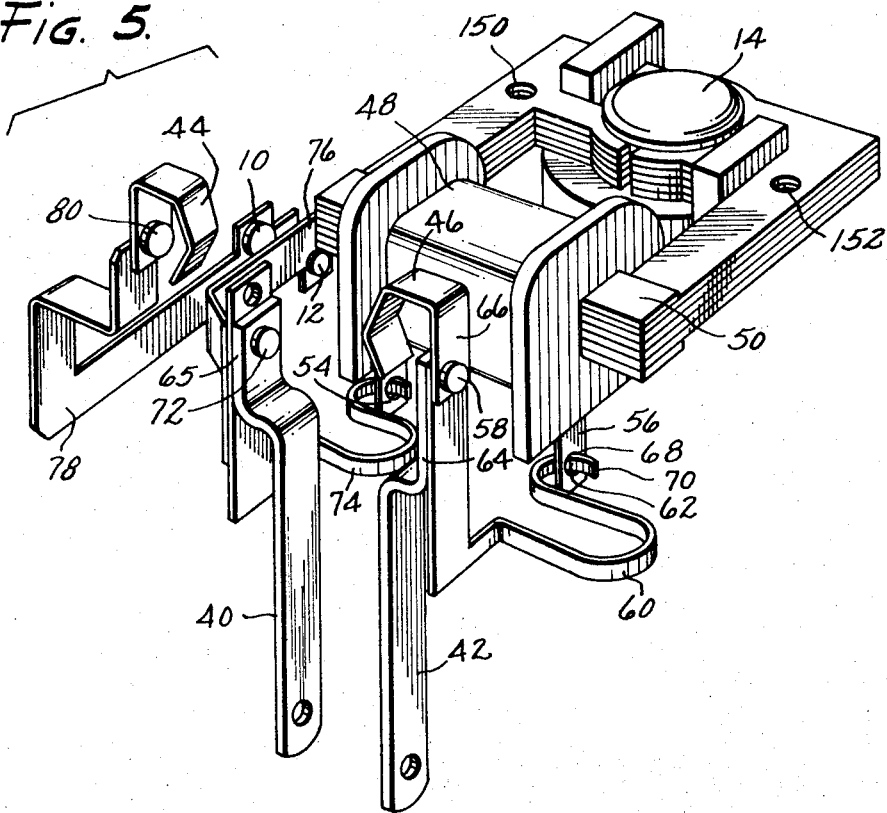
FIG. 5 is an exploded perspective view of the inlet prongs, outlet receptacle springs, electric motor and switch of the time switch illustrated in FIG. 1.

As shown more particularly in FIG. 5, a rivet 58, a stamped sheet metal piece 60 and a piece of solder 62 is all that is required for connecting the inlet prong 42 to the outlet receptacle spring contact 46 and one of the motor terminals 56. As shown, the rivet 58 extends through an inner forwardly extending terminal portion 64 of inlet prong 42, a forward portion of a sheet metal connector 60 and an outer portion 66 of the receptacle spring contact 46. An aperture 68 is formed in the terminal 56 of the motor coil and a reduced portion 70 of the sheet metal terminal 60 extends through the aperture and is held therein by a drop of solder 62. A generally similar arrangement is provided for connecting the inlet prong 40 to the other terminal 54 of the motor coil 48, and as illustrated in FIG. 5, a rivet 72 extends through the inlet prong 40 and a sheet metal strip 74. The connection is completed by attaching the strip 74 to terminal 54.

The switch 10, 12 is positioned between the inlet prong 40 and the outlet receptacle spring 44 for selectively energizing the outlet receptacle 44, 46 and the appliance to be controlled, and in accordance with my invention, the switch 10, 12 is uniquely constructed and arranged with respect to the inlet prong 40 and the outlet receptacle spring contact 44 so that it may be readily positioned between the prong 40 and the receptacle spring contact 44 with the use of relatively few parts. As shown in FIG. 5, contact 12 is fixed to an end portion of a leaf spring 76 which is fixed to the inlet prong 40 by the use of the same rivet 72 which is provided for connecting strip 74 to the terminal 54 of the motor coil 48. The complementary contact 10 is fixed to a leaf spring switch blade 78 which in turn is connected to the outlet receptacle spring contact 44 by a rivet 80.

With the construction thus far described, most of the components illustrated in FIG. 5 including the electric motor 14, inlet prongs 40 and 42, and the receptacle spring contact 46 may be readily connected and subassembled to each other and held generally in the position illustrated in FIG. 5. A unique simple arrangement is provided for rigidly holding these parts in their assembled position within the time switch casing. As shown more particularly in FIG. 4, a forwardly extending boss 82 is integrally formed with the rear panel 30 and is provided with two through slots 84 and 86 for receiving the inlet prongs 40 and 42. As shown, the inlet prongs 40 and 42 are provided with outwardly extending shoulders 88 and 90 for abutting a forward surface 92 of the boss and also for spacing the forwardly extending terminal portions 64 and 65 of the inlet prongs outwardly away from the end portions 94 and 96 of the receptacle springs 44 and 46, respectively, so as to leave sufficient room for the inlet prongs of an appliance inlet plug which may be connected to the receptacle spring contacts 44 and 46.

A front cover 100 of the time switch housing is also integrally formed of molded plastic material and is provided with parts that are complementary to the parts of the rear casing for mounting the electric motor 14, the reduction gearing 16, the inlet prongs 40 and 42, and the other parts of my unique time switch. As illustrated more particularly in FIGS. 3 and 4, the front cover includes a front panel portion 102 for supporting a shaft 18, and the 24-hour dial 20. Two integrally formed slots 104 and 106 are positioned immediately above their respective receptacle spring contacts 44 and 46. Rearwardly extending wall portions 108, 110, 112 and 114 of the front cover are arranged to be complementary with the forwardly extending wall portions 32, 34, 36 and 38 of the rear casing.

The front cover 100 also includes a rearwardly extending enlarged boss 116 which is positioned opposite to the forwardly extending boss 82 of the rear casing. With this arrangement, as shown more particularly in FIG. 4, a spacer member 118 formed of suitable electrical insulating material is sandwiched between the rearwardly extending boss 116 and the shoulders 88 and 90 of the inlet prongs for securely holding the inlet prongs 40 and 42 in their assembled positions. As shown, a screw 120 or other suitable connecting means may be readily inserted through an aperture 122 formed in the forwardly extending boss 82 through an aperture 124 formed in the insulating member 118 and into the rearwardly extending boss 116. Thus, the parts are securely held to each other in their desired operating relationship, and the prongs 40 and 42 cannot be inadvertently pushed further into the housing when they are inserted into a wall outlet.

Figure 4:
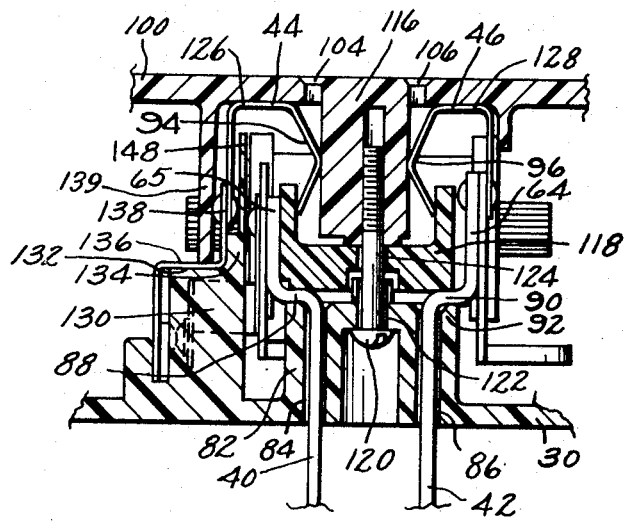
FIG. 4 is a fragmentary cross-sectional view taken along the line 4—4 of FIG. 2.

With particular reference to FIG. 4, it can also be appreciated that the receptacle springs 44 and 46 include forward portions 126 and 128 which are located in abutting relationship with the inner surface of the front wall 102 and end portions 94 and 96 which are normally in abutting relationship with the sides of the rearwardly extending boss 116. Thus, the receptacle springs are suitably guided for appropriate motion within the time switch as inlet prongs of a plug of an appliance to be controlled are moved into and out of the slots 104 and 106. The receptacle springs 44 and 46 are reliably guided so that they cannot be forced to any undesired position where they might be damaged, and thus, reduce the useful life of my time switch.

Figure 6:
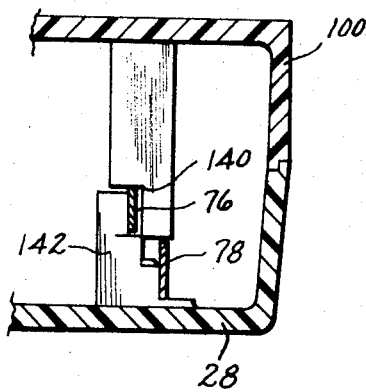
FIG. 6 is a fragmentary cross-sectional view of the time switch illustrated in FIG. 1 taken along the line 6—6 of FIG. 2.

With particular reference to FIG. 2, it can also be appreciated that the front cover and rear casing of my time switch are provided with a unique integrally formed arrangement for holding the receptacle spring 44 and the switch blade 78 and preventing them from making unwanted contact with the inlet prong 40. As illustrated in FIG. 4, the rear casing includes an integrally formed outwardly extending shelf and guiding member 130. The guide shelf 130 includes a step-like portion 132, 134 for abutting and holding surfaces 136 and 138 of the switch blade, and an inwardly extending member 139 is formed on the front casing for holding blade 136. As shown in FIG. 6, complementary step surfaces 140 and 142 are also formed on the front cover 100 and rear casing 28 of the time switch for holding and guiding portions of the switch blades 76 and 78 between the front cover and the rear casing. With reference to FIG. 4, it can also be appreciated that the member 130 which is formed with the rear casing also includes a forwardly extending wall portion 148 for suitably insulating and separating switch blade 78 and receptacle spring contact 44 from the inlet prong 40 and switch blade 76.

From the foregoing description it can be appreciated that the parts may be readily connected to each other by first constructing the subassembly illustrated in FIG. 5 and then sliding the inlet prongs 40 and 42 outwardly through their respective slots 84 and 86 which are formed in the rear casing. During this insertion apertures 150 and 152 which may be formed in the motor field laminations are aligned with apertures which are formed in the rear casing spacer posts 154, and an output pinion 156 of the motor may be inserted within its plastic guide 158 which is integrally formed with the rear casing of the time switch. Suitable screws 160 and 162 may be provided for attaching the motor field laminations and the motor to the rear casing of the time switch.

The next convenient step in the assembly of the time switch is to place the receptacle spring 44 and its switch blade 78 on the steps 132 and 134 which are integrally formed with the rear casing. The assembly may be readily completed by placing the front cover over rear casing, and carefully positioning the rearwardly extending boss 116 between receptacle springs 44 and 46. Then a screw 120 may be inserted through the aperture 122 formed in the rear casing boss 82 and threaded into the boss 116 which is formed on the front cover. Additional screws may be inserted in the apertures 168 and 170 which are formed at the lower corners of the rear casing of the time switch.

From the foregoing discussion, it can be appreciated that my unique inlet prongs, outlet receptacle spring contacts, switch blades, and electric motor may be readily assembled and reliably housed within a time switch with the use of relatively few parts. All internal wiring which is usually found in conventional time switches has been eliminated. Thus, an exceedingly simple yet reliable electric time switch construction has been achieved.

What I claim is:

1. A wall plug-in switch mechanism comprising:
   a. a housing formed of electric insulating material including a rear casing and a front cover;
   b. a pair of switch contacts positioned in said housing;
   c. a switch operator mounted on said housing for operating said switch contacts;
   d. a forwardly extending boss formed in said rear housing having a pair of slots extending therethrough;
   e. a pair of shouldered inlet prongs extending rearwardly through said slots and protruding rearwardly from said housing, the shoulders on said inlet prongs being in abutting relationship with the inner front surfaces of said boss;
   f. a complementary boss formed in said front cover having a rear surface for sandwiching the shoulders of said inlet prongs between the bosses formed on said rear casing and said front cover for securely holding said inlet prongs on said housing;
   g. a pair of slots formed in said front cover adjacent to the boss which is formed in said front cover; and
   h. a pair of receptacle spring contacts positioned in said housing behind said slots formed in the front cover, one of said receptacle spring contacts being connected to one of the inlet prongs.

2. A time switch as defined in claim 1 wherein one of said switch contacts is connected to a switch blade and the switch blade is riveted to the other inlet prong.

3. A time switch as defined in claim 2 wherein the other switch contact is connected to a second switch blade and the second switch blade is riveted to the other receptacle spring contact.

4. A time switch as defined in claim 3 wherein complementary inwardly extending surfaces are formed on said front cover and rear casing for holding and guiding portions of the switch blades between the front cover and the rear casing.

5. A time switch as defined in claim 1 wherein a screw or other securing means is positioned within the bosses formed in said rear casing and said front cover for securely holding the front cover to the rear casing and for securely holding the shouldered inlet prongs between the bosses.

6. A time switch comprising:
   a. a housing formed of electric insulating material including a rear casing and a front cover;
   b. a pair of switch contacts positioned in said housing;
   c. a switch operator rotatably mounted on said front cover for operating said switch contacts;
   d. a forwardly extending boss formed in said rear housing having a pair of slots extending therethrough;
   e. a pair of shouldered inlet prongs extending rearwardly through said slots and protruding rearwardly from said housing, the shoulders on said inlet prongs being in abutting relationship with inner front surfaces of said boss; and
   f. a complementary boss formed in said front cover having a rear surface for sandwiching the shoulders of said inlet prongs between the bosses formed on said rear casing and said front cover for securely holding said inlet prongs on said housing.

7. A wall plug-in time switch mechanism comprising:
   a. a housing formed of electric insulating material including a rear casing and a front cover;
   b. a pair of switch contacts positioned in said housing;
   c. a time driven dial rotatably mounted on said front cover;
   d. a switch operator rotatably mounted on said front cover adjacent to said time driven dial;
   e. switch on and switch off members rotatable with said dial for moving said switch operator at preset times to open and close said pair of switch contacts;
   f. a forwardly extending boss formed in said rear housing having a pair of slots extending therethrough;
   g. a pair of shouldered inlet prongs extending rearwardly through said slots and protruding rearwardly from said housing, the shoulders on said inlet prongs being in abutting relationship with the inner front faces of said boss;
   h. a complementary boss formed in said front cover having a rear surface for sandwiching the shoulders of said inlet prongs between the bosses formed on said rear casing and said front cover for securely holding said inlet prongs on said housing; and
   i. an electric motor positioned in said housing for driving said time driven dial as a function of time, said motor including a coil having a pair of terminals positioned adjacent to said inlet prongs, one of said motor coil terminals being directly connected to one of the inlet prongs and the other motor coil terminal being directly connected to the other inlet prong.

8. A time switch as defined in claim 7 wherein a spacer member formed of electrical insulating material is positioned between the boss formed on said front cover and the shoulders of said inlet prongs for shielding the inlet prongs and for securely holding them between the bosses formed on the rear casing and front cover.

* * * * *